US012670116B2

(12) United States Patent (10) Patent No.: US 12,670,116 B2
Lin et al. (45) Date of Patent: Jun. 30, 2026

(54) INTERFACE CONVERSION DEVICE

(71) Applicant: VIA LABS, INC., New Taipei City (TW)

(72) Inventors: Yu-Lung Lin, New Taipei City (TW); Chih-Nan Lo, New Taipei City (TW); Hui-De Kang, New Taipei City (TW)

(73) Assignee: VIA LABS, INC., New Taipei City (TW)

( * ) Notice: Subject to any disclaimer, the term of this patent is extended or adjusted under 35 U.S.C. 154(b) by 37 days.

(21) Appl. No.: 19/033,516

(22) Filed: Jan. 22, 2025

(65) Prior Publication Data

US 2025/0238387 A1 Jul. 24, 2025

Related U.S. Application Data

(60) Provisional application No. 63/624,258, filed on Jan. 23, 2024.

(30) Foreign Application Priority Data

Aug. 26, 2024 (TW) ................................. 113132027

(51) Int. Cl.
*G06F 13/26* (2006.01)
*G06F 13/38* (2006.01)
(Continued)

(52) U.S. Cl.
CPC ........ *G06F 13/4068* (2013.01); *G06F 13/382* (2013.01); *G06F 13/4282* (2013.01); *G06F 2213/0042* (2013.01); *G06F 2213/40* (2013.01)

(58) Field of Classification Search
None
See application file for complete search history.

(56) References Cited

U.S. PATENT DOCUMENTS

2019/0073000 A1* 3/2019 Lee ......................... G06F 1/266
2019/0138489 A1 5/2019 Hundal et al.
(Continued)

FOREIGN PATENT DOCUMENTS

CN 107408082 11/2017
CN 112231268 1/2021
CN 219997569 11/2023

OTHER PUBLICATIONS

"Office Action of Taiwan Counterpart Application", issued on Dec. 25, 2024, p. 1-p. 7.

*Primary Examiner* — Henry Tsai
*Assistant Examiner* — Dean Phan
(74) *Attorney, Agent, or Firm* — JCIPRNET

(57) ABSTRACT

An interface conversion device includes a USB connector and a DP connector, a conversion driver, and a DP multiplexer. The conversion driver includes a UFP coupled to the USB connector and a DP output port. The DP multiplexer includes a USB port coupled to the DP output port and a DP port coupled to the DP connector. The conversion driver detects configuration information of a CC pin of the USB connector and determines an operation mode and a first pin assignment mode of the interface conversion device according to the configuration information. When the operation mode is a DP ALT mode, the conversion driver sets a second pin assignment mode between the UFP and the DP output port based on the first pin assignment mode and controls the DP multiplexer based on the first pin assignment mode to set a third pin assignment mode between the USB and DP ports.

10 Claims, 9 Drawing Sheets

(51) Int. Cl.
    *G06F 13/40*        (2006.01)
    *G06F 13/42*        (2006.01)

(56)          References Cited

U.S. PATENT DOCUMENTS

2021/0271620 A1\* 9/2021 Lin ..................... G06F 13/4282
2024/0143538 A1\* 5/2024 Chen ....................... G06F 13/38

\* cited by examiner

| Interface conversion device | Conversion driver | DP multiplexer |
|---|---|---|
| Normal plug orientation pin assignment C mode | Normal plug orientation pin assignment C mode | Normal plug orientation pin assignment C mode |
| Flipped plug orientation pin assignment C mode | Flipped plug orientation pin assignment C mode | Normal plug orientation pin assignment C mode |
| Normal plug orientation pin assignment D mode | Normal plug orientation pin assignment D mode | Normal plug orientation pin assignment C mode |
| Flipped plug orientation pin assignment D mode | Flipped plug orientation pin assignment D mode | Normal plug orientation pin assignment D mode |
| Normal plug orientation pin assignment E mode | Flipped plug orientation pin assignment C mode | Flipped plug orientation pin assignment E mode |
| Flipped plug orientation pin assignment E mode | Normal plug orientation pin assignment C mode | Flipped plug orientation pin assignment E mode |

FIG. 3

INTERFACE CONVERSION DEVICE

CROSS-REFERENCE TO RELATED APPLICATION

This application claims the priority benefit of U.S. Provisional Application No. 63/624,258, filed on Jan. 23, 2024 and Taiwan Application No. 113132027, filed on Aug. 26, 2024. The entirety of each of the above-mentioned patent applications is hereby incorporated by reference herein and made a part of this specification.

BACKGROUND OF THE INVENTION

Field of the Invention

The invention relates to an electronic device, and in particular to an interface conversion device.

Description of Related Art

Different electronic devices may have different connectors (different transmission interfaces). For example, a first device has a Universal Serial Bus (USB) connector, and a second device has a Display Port (DP) connector. An interface conversion device may be connected between the USB connector of the first device (e.g., a host) and the DP connector of the second device. The interface conversion device may provide an interface conversion function to transmit data output from the USB connector of the first device to the DP connector of the second device, and/or transmit the data output by the DP connector of the second device to the USB connector of the first device. How to implement an interface conversion device that may support a plurality of pin assignment modes is one of the many technical issues in the art.

SUMMARY OF THE INVENTION

The invention provides an interface conversion device that may support a plurality of pin assignment modes to complete data transmission between different transmission interfaces.

In an embodiment of the invention, the interface conversion device includes a Universal Serial Bus (USB) connector, a Display Port (DP) connector, a conversion driver, and a DP multiplexer. The conversion driver includes an upstream-facing port (UFP) and a DP output port. The DP multiplexer includes a USB port and a DP port. The UFP of the conversion driver is coupled to the USB connector. The USB port of the DP multiplexer is coupled to the DP output port of the conversion driver. The DP port of the DP multiplexer is coupled to the DP connector. The conversion driver detects configuration information of a configuration channel (CC) pin of the USB connector. The conversion driver determines an operation mode and a first pin assignment mode of the interface conversion device according to the configuration information. When the operation mode is a DP ALT mode, the conversion driver sets a second pin assignment mode between the UFP and the DP output port based on the first pin assignment mode of the interface conversion device and controls the DP multiplexer based on the first pin assignment mode of the interface conversion device to set a third pin assignment mode between the USB port and the DP port.

Based on the above, the interface conversion device of an embodiment of the invention may determine the operation mode and the first pin assignment mode of the interface conversion device based on the configuration information and change the second pin assignment mode of the conversion driver and/or the third pin assignment mode of the DP multiplexer based on the current first pin assignment mode to complete data transmission between different transmission interfaces. Therefore, the interface conversion device may support a plurality of pin assignment modes.

In order to make the aforementioned features and advantages of the disclosure more comprehensible, embodiments accompanied with figures are described in detail below.

BRIEF DESCRIPTION OF THE DRAWINGS

FIG. 3 is a schematic diagram of the corresponding relationship between pin assignment modes of a conversion driver and a DP multiplexer when an interface conversion device is in different pin assignment modes shown according to an embodiment of the invention.

DESCRIPTION OF THE EMBODIMENTS

Figure 1:
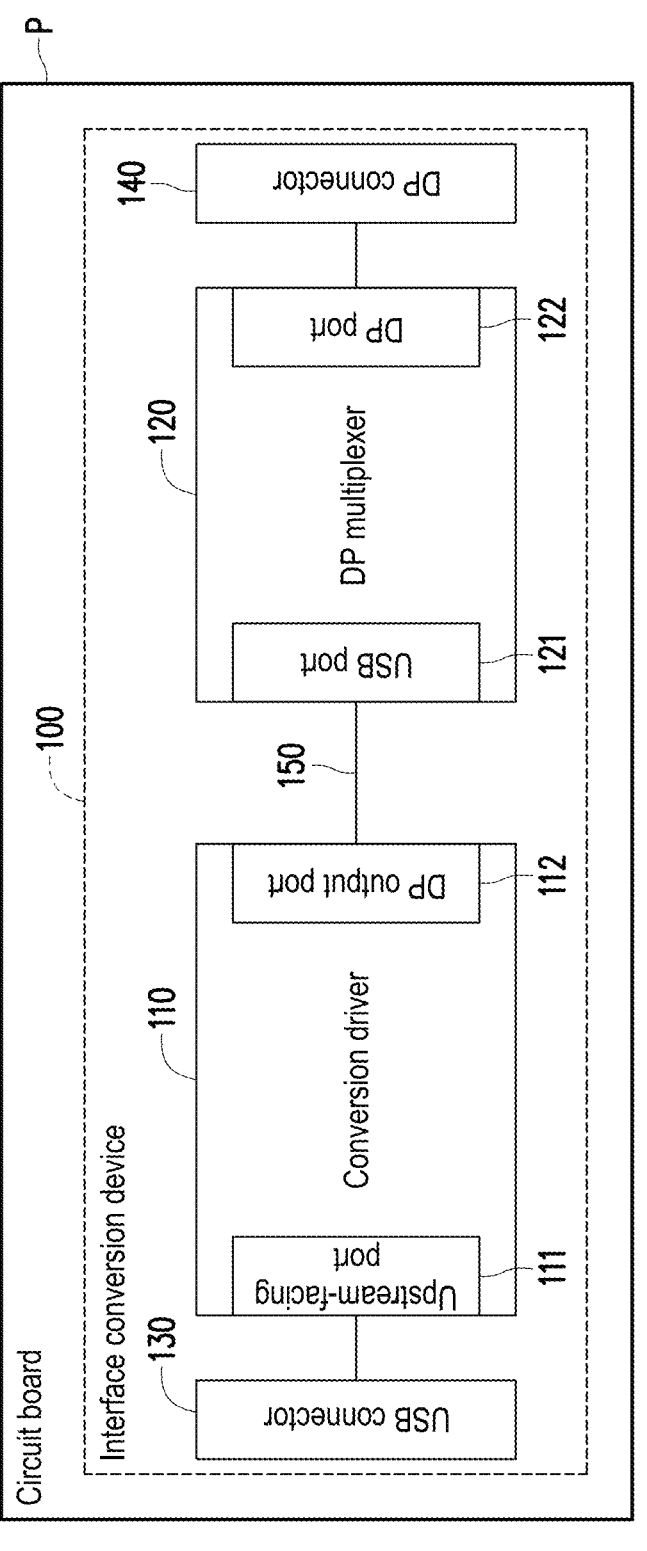
FIG. 1 is a schematic diagram of an interface conversion device according to an embodiment of the invention.

The term "coupled to (or connected to)" used in the entire text of the specification of the present application (including claims) may refer to any direct or indirect connecting means. For example, if it is herein described that a first device is coupled (or connected) to a second device, it should be interpreted that the first device may be directly connected to the second device, or the first device may be indirectly connected to the second device via other devices or some connection means. Terms such as "first" and "second"

mentioned throughout the specification (including the claims) of the present application are used to name elements or to distinguish between different embodiments or scopes, and are not used to limit the upper bound or the lower bound of the number of elements, nor used to limit the sequence of elements. In addition, wherever possible, elements/members/steps using the same reference numerals in the drawings and embodiments denote the same or similar parts. Cross-reference may be made to relevant descriptions of elements/members/steps using the same reference numerals or using the same terms in different embodiments.

FIG. 1 is a schematic diagram of an interface conversion device 100 according to an embodiment of the invention. The interface conversion device 100 shown in FIG. 1 includes a universal serial bus (USB) connector 130, a display port (DP) connector 140, a conversion driver 110, and a DP multiplexer (MUX) 120. The conversion driver 110 includes an upstream-facing port (UFP) 111 and a DP output port 112. The DP multiplexer 120 includes a USB port 121 and a DP port 122. The UFP 111 of the conversion driver 110 is coupled to the USB connector 130. The USB port 121 of the DP multiplexer 120 is coupled to the DP output port 112 of the conversion driver 110 via a route 150. Based on actual design, the route 150 may include a printed circuit board (PCB) route, a cable line route, and/or other transmission media. The DP port 122 of the DP multiplexer 120 is coupled to the DP connector 140.

Based on actual application, the USB connector 130 may be a USB Type-C connector compliant with the USB specification, the UFP 111 may be a USB UFP compliant with the USB specification, and the DP connector 140 may be a DP connector compliant with the DP specification. The conversion driver 110 detects configuration information of a configuration channel (CC) pin of the USB connector 130. The CC pin may include a CC1 pin and/or a CC2 pin specified by the USB specification. The conversion driver 110 may exchange configuration information with a USB host (not shown) via the CC pin of the USB connector 130, thereby determining the operation mode and the first pin assignment mode of the interface conversion device 100 according to the configuration information. For example, the USB host may be a graphics card or other electronic device or element having a USB connector.

Based on the USB specification, when the operation mode of the interface conversion device 100 is the DP ALT mode, the USB connector 130 may be defined as different pin assignment modes, for example, pin assignment C mode, pin assignment D mode, or pin assignment E mode compliant with the USB specification. In the DP ALT mode, when the first pin assignment mode of the interface conversion device 100 is the pin assignment C mode or the pin assignment E mode compliant with the USB specification, the four high-speed lanes of the USB connector 130 may be used as four DP lanes. The four high-speed lanes of the USB connector 130 are respectively a transmitting pin pair TX1, a transmitting pin pair TX2, a receiving pin pair RX1, and a receiving pin pair RX2 specified by the USB standard. The transmitting pin pair TX1 includes a pin TX1+ and a pin TX1−. The transmitting pin pair TX2 includes a pin TX2+ and a pin TX2−. The receiving pin pair RX1 includes a pin RX1+ and a pin RX1−. The receiving pin pair RX2 includes a pin RX2+ and a pin RX2−. Moreover, in the DP ALT mode, when the first pin assignment mode of the interface conversion device 100 is the pin assignment D mode compliant with the USB specification, the two high-speed lanes of the USB connector 130 (such as the transmitting pin pair TX1 and the receiving pin pair RX1) are used as USB lanes, and the other two high-speed lanes (such as the transmitting pin pair TX2 and the receiving pin pair RX2) of the USB connector 130 are used as DP lanes.

Based on actual design, the conversion driver 110 may be a USB controller, a USB repeater, a redriver, and/or a retimer. When the operation mode of the interface conversion device 100 is the DP ALT mode, the UFP 111 of the conversion driver 110 may receive DP video data compliant with the DP specification from a host (not shown) via the USB connector 130. Next, the conversion driver 110 transmits the DP video data to the USB port 121 of the DP multiplexer 120 via the DP output port 112 and the route 150, so that the DP multiplexer 120 transmits the DP video data to the high-speed lane (such as an ML_Lane_0 lane, an ML_Lane_1 lane, an ML_Lane_2 lane, and/or an ML_Lane_3 lane) of the DP connector 140 via the DP port 122. The DP connector 140 may output the DP video data to the next electronic device. For example, the DP connector 140 may output the DP video data to a display device (not shown). In this way, in the DP ALT mode, the interface conversion device 100 may receive the DP video data from a host (not shown) via the USB port 130, and provide correct DP video data to a display device (not shown) via the conversion driver 110, the route 150, the DP multiplexer 120, and the DP connector 140 to complete the data transmission.

Figure 2:
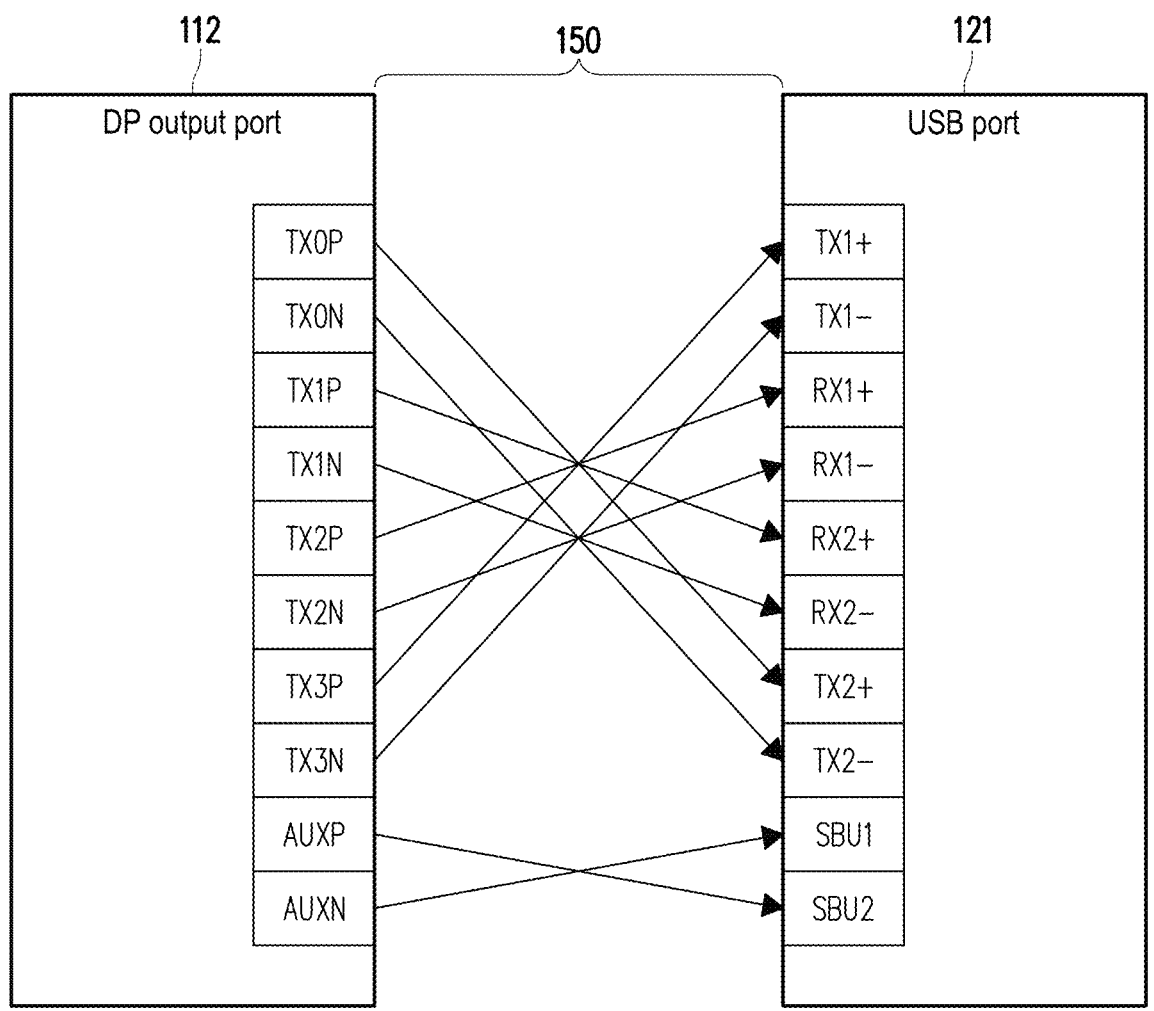
FIG. 2 is a schematic diagram of a route between a DP output port of a conversion driver and a USB port of a DP multiplexer shown according to an embodiment of the invention.

FIG. 2 is a schematic diagram of the route 150 between the DP output port 112 of the conversion driver 110 and the USB port 121 of the DP multiplexer 120 shown according to an embodiment of the invention. The route 150 shown in FIG. 2 may be a printed circuit board route (circuit board routing). The USB port 121 of the DP multiplexer 120 is coupled to the DP output port 112 of the conversion driver 110 via a printed circuit board route. In the embodiment shown in FIG. 2, the ML_Lane_0 lane (transmitting pins TX0P and TX0N) of the DP output port 112 is coupled to the TX2 high-speed lane (the transmitting pins TX2+ and TX2−) of the USB port 121 via the first pair of wires of the printed circuit board route (the route 150). The ML_Lane_1 lane (transmitting pins TX1P and TX1N) of the DP output port 112 is coupled to the RX2 high-speed lane (the receiving pins RX2+ and RX2−) of the USB port 121 via the second pair of wires of the printed circuit board route (the route 150). The ML_Lane_2 lane (transmitting pins TX2P and TX2N) of the DP output port 112 is coupled to the RX1 high-speed lane (the receiving pins RX1+ and RX1−) of the USB port 121 via the third pair of wires of the printed circuit board route (the route 150). The ML_Lane_3 lane (transmitting pins TX3P and TX3N) of the DP output port 112 is coupled to the TX1 high-speed lane (the transmitting pins TX1+ and TX1−) of the USB port 121 via the fourth pair of wires of the printed circuit board route (the route 150). A P auxiliary channel pin AUXP of the DP output port 112 is coupled to a sideband use (SBU) pin SBU2 of the USB port 121 via the first wire of the printed circuit board route (the route 150). An N auxiliary channel pin AUXN of the DP output port 112 is coupled to an SBU pin SBU1 of the USB port 121 via the second wire of the printed circuit board route (the route 150).

FIG. 3 is a schematic diagram of the corresponding relationship between the pin assignment modes of the conversion driver 110 and the DP multiplexer 120 when the interface conversion device 100 is in different pin assignment modes shown according to an embodiment of the invention. When the operation mode of the interface conversion device 100 is the DP ALT mode, the conversion driver 110 may set the second pin assignment mode between the UFP 111 and the DP output port 112 based on the first pin assignment mode of the interface conversion device 100. In addition, the conversion driver 110 may control the DP multiplexer 120 based on the first pin assignment mode of the interface conversion device 100 to set the third pin assignment mode between the USB port 121 and the DP port 122. For example, when the pin assignment mode (that is, the first pin assignment mode) of the interface conversion device 100 is a normal plug orientation pin assignment C mode, the conversion driver 110 may set the pin assignment mode (i.e., the second pin assignment mode) between the UFP 111 and the DP output port 112 to the normal plug orientation pin assignment C mode, and the DP multiplexer 120 is controlled to set the pin assignment mode (i.e., the third pin assignment mode) between the USB port 121 and the DP port 122 to the normal plug orientation pin assignment C mode. The second pin assignment mode between the UFP 111 and the DP output port 112 is a plurality of pin assignment modes compliant with the conversion driver specification, and the third pin assignment mode between the USB port 121 and the DP port 122 is a plurality of pin assignment modes compliant with the DP multiplexer specification.

Figure 4:
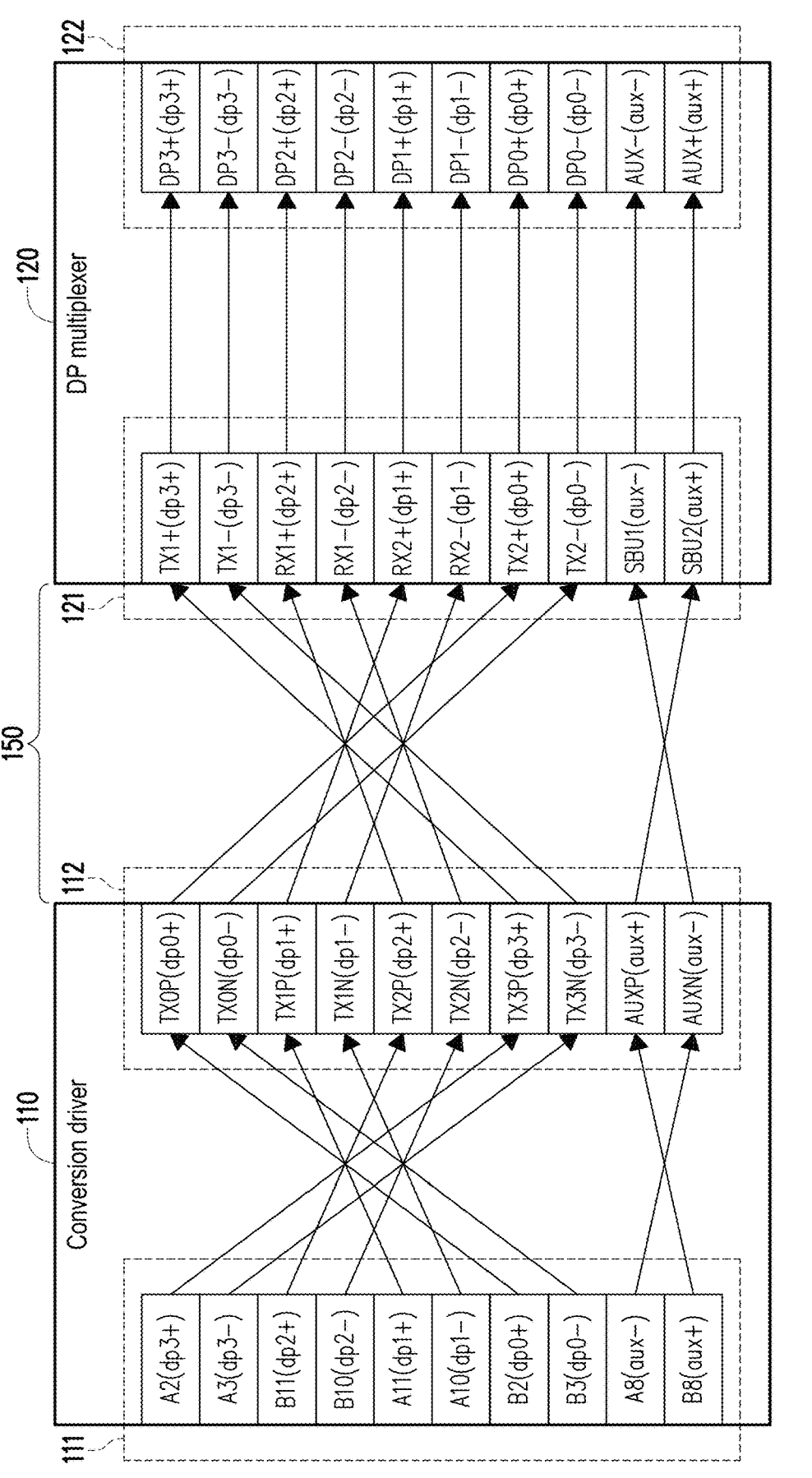
FIG. 4 is a schematic diagram of a signal route between a conversion driver and a DP multiplexer when an interface conversion device is in a normal plug orientation pin assignment C mode shown according to an embodiment of the invention.

FIG. 4 is a schematic diagram of a signal route between the conversion driver 110 and the DP multiplexer 120 when the interface conversion device 100 is in the normal plug orientation pin assignment C mode shown according to an embodiment of the invention. Please refer to FIG. 3 and FIG. 4. When the first pin assignment mode of the interface conversion device 100 is the normal plug orientation pin assignment C mode compliant with the USB specification, the conversion driver 110 may set the second pin assignment mode to the normal plug orientation pin assignment C mode. When the second pin assignment mode is the normal plug orientation pin assignment C mode, pins A2 and A3 (the pins A2 and A3 of the USB connector 130) of the UFP 111 may transmit data signals dp3+ and dp3− to the ML_Lane_3 lane (the transmitting pins TX3P and TX3N) of the DP output port 112. Pins B11 and B10 (the pins B11 and B10 of the USB connector 130) of the UFP 111 may transmit data signals dp2+ and dp2− to the ML_Lane_2 lane (the transmitting pins TX2P and TX2N) of the DP output port 112. Pins A11 and A10 (the pins A11 and A10 of the USB connector 130) of the UFP 111 may transmit data signals dp1+ and dp1− to the ML_Lane_1 lane (the transmitting pins TX1P and TX1N) of the DP output port 112. Pins B2 and B3 (the pins B2 and B3 of the USB connector 130) of the UFP 111 may transmit data signals dp0+ and dp0− to the ML_Lane_0 lane (the transmitting pins TX0P and TX0N) of the DP output port 112. A pin A8 (the pin A8 of the USB connector 130) of the UFP 111 may transmit an auxiliary signal aux− to the N auxiliary channel pin AUXN of the DP output port 112. A pin B8 (the pin B8 of the USB connector 130) of the UFP 111 may transmit an auxiliary signal aux+ to the P auxiliary channel pin AUXP of the DP output port 112.

Moreover, when the first pin assignment mode of the interface conversion device 100 is the normal plug orientation pin assignment C mode compliant with the USB specification, the conversion driver 110 may control the DP multiplexer 120 to set the third pin assignment mode to the normal plug orientation pin assignment C mode. When the third pin assignment mode is the normal plug orientation pin assignment C mode, the TX1 high-speed lane (the transmitting pins TX1+ and TX1−) of the USB port 121 may transmit the data signals dp3+ and dp3− to the ML_Lane_3 lane (pins DP3+ and DP3−) of the DP port 122. The RX1 high-speed lane (the receiving pins RX1+ and RX1−) of the USB port 121 may transmit the data signals dp2+ and dp2− to the ML_Lane_2 lane (pins DP2+ and DP2−) of the DP port 122. The RX2 high-speed lane (the receiving pins RX2+ and RX2−) of the USB port 121 may transmit the data signals dp1+ and dp1− to the ML_Lane_1 lane (pins DP1+ and DP1−) of the DP port 122. The TX2 high-speed lane (the receiving pins TX2+ and TX2−) of the USB port 121 may transmit the data signals dp0+ and dp0− to the ML_Lane_0 lane (pins DP0+ and DP0−) of the DP port 122. In addition, the SBU pins SBU1 and SBU2 of the USB port 121 may respectively transmit the auxiliary signals aux− and aux+ to an N auxiliary channel pin AUX− and a P auxiliary channel pin AUX+ of the DP port 122.

In this way, in the DP ALT mode, the interface conversion device 100 may support the normal plug orientation pin assignment C mode compliant with the USB specification. The conversion driver 110, the route 150 (shown in FIG. 2), and the DP multiplexer 120 may complete correct data transmission.

Figure 5:
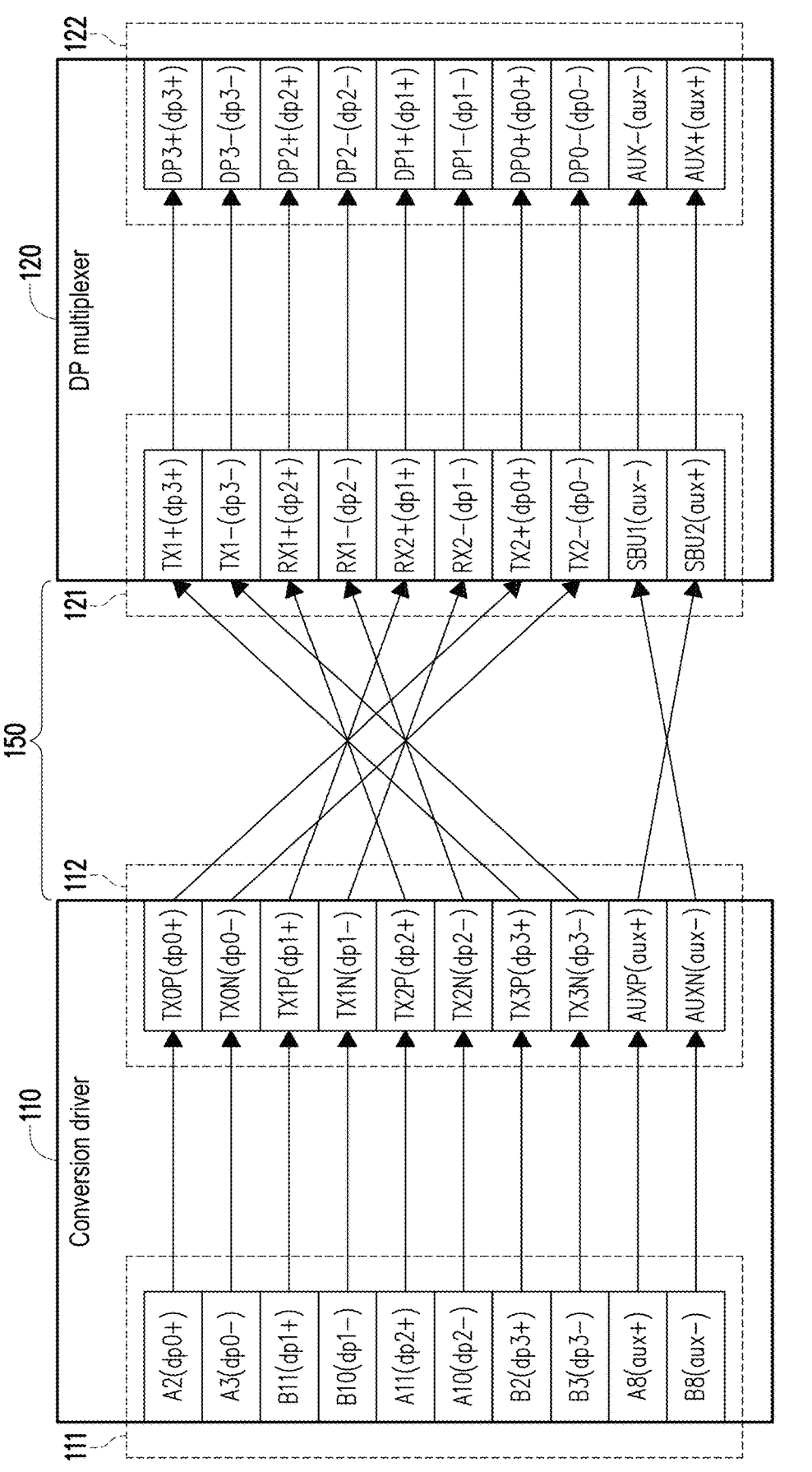
FIG. 5 is a schematic diagram of a signal route between a conversion driver and a DP multiplexer when an interface conversion device is in a flipped plug orientation pin assignment C mode shown according to an embodiment of the invention.

FIG. 5 is a schematic diagram of a signal route between the conversion driver 110 and the DP multiplexer 120 when the interface conversion device 100 is in a flipped plug orientation pin assignment C mode shown according to an embodiment of the invention. Please refer to FIG. 3 and FIG. 5. When the first pin assignment mode of the interface conversion device 100 is the flipped plug orientation pin assignment C mode compliant with the USB specification, the conversion driver 110 may set the second pin assignment mode to the flipped plug orientation pin assignment C mode. For example, the pins A2 and A3 of the UFP 111 may transmit the data signals dp0+ and dp0− to the transmitting pins TX0P and TX0N of the DP output port 112. The pins B11 and B10 of the UFP 111 may transmit the data signals dp1+ and dp1− to the transmitting pins TX1P and TX1N of the DP output port 112. The pins A11 and A10 of the UFP 111 may transmit the data signals dp2+ and dp2− to the transmitting pins TX2P and TX2N of the DP output port 112. The pins B2 and B3 of the UFP 111 may transmit the data signals dp3+ and dp3− to the transmitting pins TX3P and TX3N of the DP output port 112. The pin A8 of the UFP 111 may transmit the auxiliary signal aux+ to the P auxiliary channel pin AUXP of the DP output port 112. The socket pin B8 of the UFP 111 may transmit the auxiliary signal aux− to the N auxiliary channel pin AUXN of the DP output port 112.

Moreover, when the first pin assignment mode of the interface conversion device 100 is the flipped plug orientation pin assignment C mode compliant with the USB specification, the conversion driver 110 may control the DP multiplexer 120 to set the third pin assignment mode to the normal plug orientation pin assignment C mode. Regarding the details related to the DP multiplexer 120 being the normal plug orientation pin assignment C mode, please refer to the embodiment of FIG. 4, and the details are not repeated here.

In this way, the interface conversion device 100 may support the flipped plug orientation pin assignment C mode compliant with the USB specification. The conversion driver 110, the route 150 (shown in FIG. 2), and the DP multiplexer 120 may complete correct data transmission.

Figure 6:
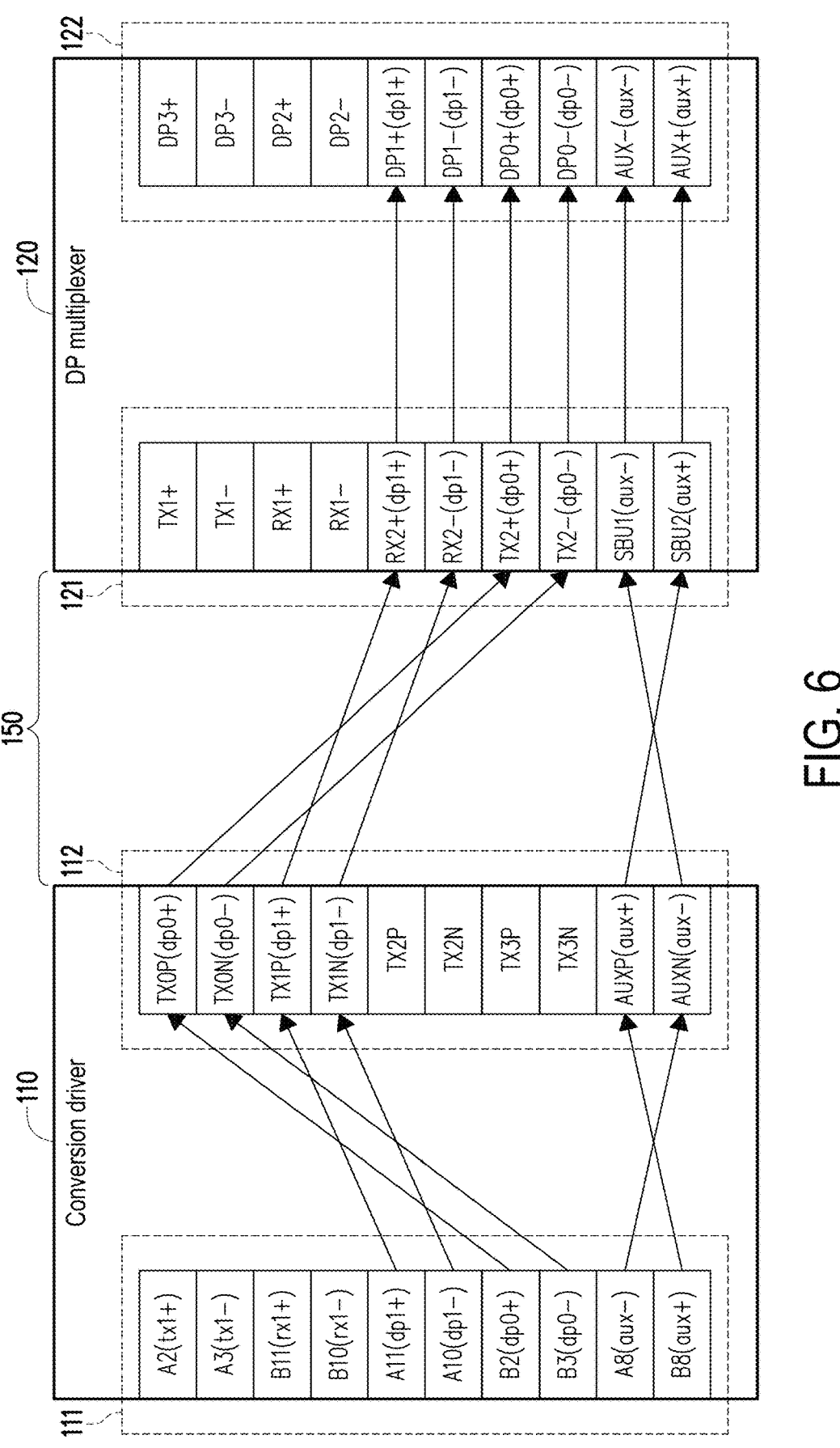
FIG. 6 is a schematic diagram of a signal route between a conversion driver and a DP multiplexer when an interface conversion device is in a normal plug orientation pin assignment D mode shown according to an embodiment of the invention.

FIG. 6 is a schematic diagram of a signal route between the conversion driver 110 and the DP multiplexer 120 when the interface conversion device 100 is in a normal plug orientation pin assignment D mode shown according to an embodiment of the invention. Please refer to FIG. 3 and FIG. 6. When the first pin assignment mode of the interface conversion device 100 is the normal plug orientation pin assignment D mode compliant with the USB specification, the conversion driver 110 may set the second pin assignment mode to the normal plug orientation pin assignment D mode, and control the DP multiplexer 120 to set the third pin assignment mode to the normal plug orientation pin assignment D mode.

When the conversion driver 110 sets the second pin assignment mode to the normal plug orientation pin assignment D mode, the pins A11 and A10 of the UFP 111 may transmit the data signals dp1+ and dp1− to the transmitting pins TX1P and TX1N of the DP output port 112. The pins B2 and B3 of the UFP 111 may transmit the data signals dp0+ and dp0− to the transmitting pins TX0P and TX0N of the DP output port 112. The pin A8 of the UFP 111 may transmit the auxiliary signal aux− to the N auxiliary channel pin AUXN of the DP output port 112. The pin B8 of the UFP 111 may transmit the auxiliary signal aux+ to the P auxiliary channel pin AUXP of the DP output port 112.

Moreover, when the third pin assignment mode of the DP multiplexer 120 is set to the normal plug orientation pin assignment D mode, the receiving pins RX2+ and RX2− of the USB port 121 may transmit the data signals dp1+ and dp1− to the pins DP1+ and DP1− of the DP port 122. The transmitting pins TX2+ and TX2− of the USB port 121 may transmit the data signals dp0+ and dp0− to the pins DP0+ and DP0− of the DP port 122. In addition, the SBU pins SBU1 and SBU2 of the USB port 121 may respectively transmit the auxiliary signals aux− and aux+ to the N auxiliary channel pin AUX− and the P auxiliary channel pin AUX+ of the DP port 122.

It may be known according to the embodiment of FIG. 6 that the interface conversion device 100 may support the normal plug orientation pin assignment D mode compliant with the USB specification. The conversion driver 110, the route 150 (shown in FIG. 2), and the DP multiplexer 120 may complete correct data transmission.

Figure 7:
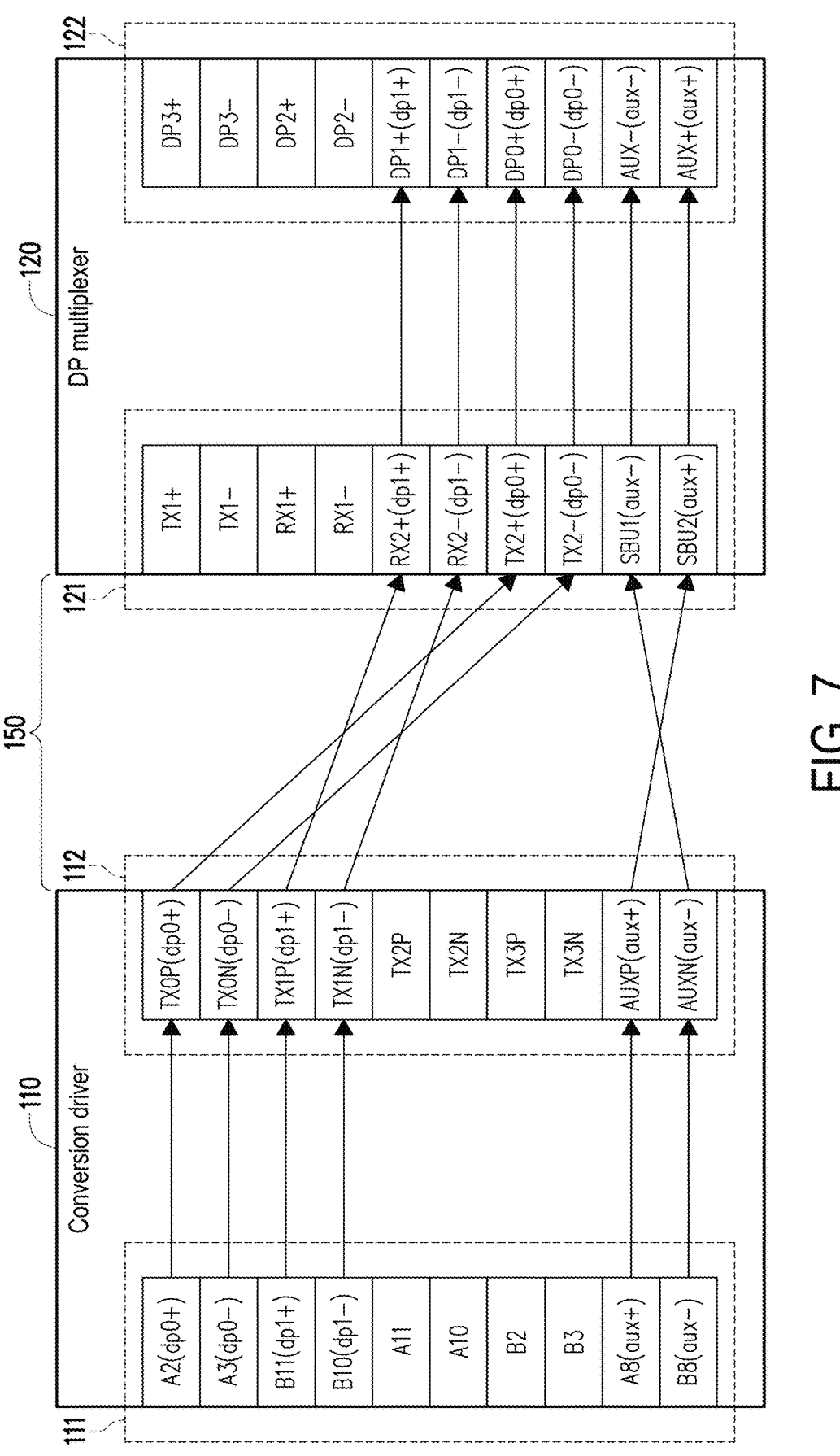
FIG. 7 is a schematic diagram of a signal route between a conversion driver and a DP multiplexer when an interface conversion device is in a flipped plug orientation pin assignment D mode shown according to an embodiment of the invention.

FIG. 7 is a schematic diagram of a signal route between the conversion driver 110 and the DP multiplexer 120 when the interface conversion device 100 is in a flipped plug orientation pin assignment D mode shown according to an embodiment of the invention. Please refer to FIG. 3 and FIG. 7. When the first pin assignment mode of the interface conversion device 100 is the flipped plug orientation pin assignment D mode compliant with the USB specification, the conversion driver 110 sets the second pin assignment mode to the flipped plug orientation pin assignment D mode, and control the DP multiplexer 120 to set the third pin assignment mode to the normal plug orientation pin assignment D mode.

When the second pin assignment mode of the conversion driver 110 is the flipped plug orientation pin assignment D mode compliant with the USB specification, the pins A2 and A3 of the UFP 111 may transmit the data signals dp0+ and dp0− to the transmitting pins TX0P and TX0N of the DP output port 112. The pins B11 and B10 of the UFP 111 may transmit the data signals dp1+ and dp1− to the transmitting pins TX1P and TX1N of the DP output port 112. The pin A8 of the UFP 111 may transmit the auxiliary signal aux+ to the P auxiliary channel pin AUXP of the DP output port 112. The socket pin B8 of the UFP 111 may transmit the auxiliary signal aux− to the N auxiliary channel pin AUXN of the DP output port 112. Regarding the details related to the DP multiplexer 120 being the normal plug orientation pin assignment D mode, please refer to the embodiment shown in FIG. 6, and the details are not repeated here.

It may be known according to the embodiment of FIG. 7 that the interface conversion device 100 may support the flipped plug orientation pin assignment D mode compliant with the USB specification. The conversion driver 110, the route 150 (shown in FIG. 2), and the DP multiplexer 120 may complete correct data transmission.

Figure 8:
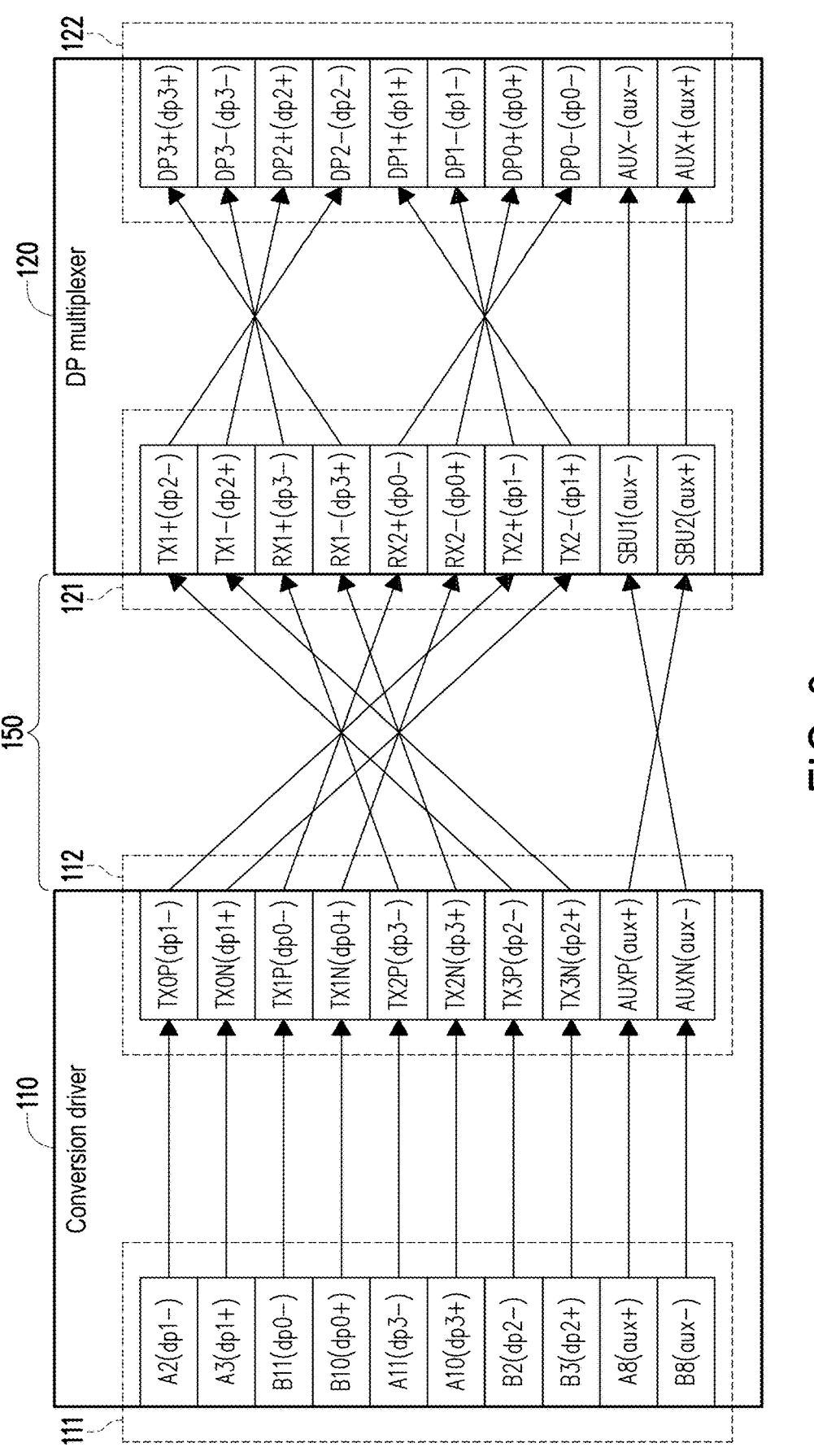
FIG. 8 is a schematic diagram of a signal route between a conversion driver and a DP multiplexer when an interface conversion device is in a normal plug orientation pin assignment E mode shown according to an embodiment of the invention.

FIG. 8 is a schematic diagram of a signal route between the conversion driver 110 and the DP multiplexer 120 when the interface conversion device 100 is in a normal plug orientation pin assignment E mode shown according to an embodiment of the invention. Please refer to FIG. 3 and FIG. 8. When the first pin assignment mode of the interface conversion device 100 is the normal plug orientation pin assignment E mode compliant with the USB specification, the conversion driver 110 may set the second pin assignment mode to the flipped plug orientation pin assignment C mode, and control the DP multiplexer 120 to set the third pin assignment mode to a flipped plug orientation pin assignment E mode. Regarding the details of the conversion driver 110 being the flipped plug orientation pin assignment C mode, please refer to the embodiment shown in FIG. 5 for analogies, and the details are not repeated here.

Moreover, when the third pin assignment mode of the DP multiplexer 120 is set to the flipped plug orientation pin assignment E mode, the transmitting pin TX1+ of the USB port 121 transmits the data signal dp2− to the pin DP2− of the DP port 122, the transmitting pin TX1− of the USB port 121 transmits the data signal dp2+ to the pin DP2+ of DP port 122, the receiving pin RX1+ of the USB port 121 transmits the data signal dp3− to the pin DP3− of the DP port 122, the receiving pin RX1− of the USB port 121 transmits the data signal dp3+ to the pin DP3+ of the DP port 122, the receiving pin RX2+ of the USB port 121 transmits the data signal dp0− to the pin DP0− of the DP port 122, the receiving pin RX2− of the USB port 121 transmits the data signal dp0+ to the pin DP0+ of the DP port 122, the transmitting pin TX2+ of the USB port 121 transmits the data signal dp1− to the pin DP1− of the DP port 122, and the transmitting pin TX2− of the USB port 121 transmits the data signal dp1+ to the pin DP1+ of the DP port 122. In addition, the SBU pins SBU1 and SBU2 of the USB port 121 may respectively transmit the auxiliary signals aux− and aux+ to the auxiliary channel pins AUX− and AUX+ of the DP port 122.

Accordingly, the interface conversion device 100 may support the normal plug orientation pin assignment E mode compliant with the USB specification. The conversion driver 110, the route 150 (shown in FIG. 2), and the DP multiplexer 120 may complete correct data transmission. It is worth mentioning that in the embodiment of FIG. 8, the conversion driver 110 may adopt the flipped plug orientation pin assignment C mode with the circuit board routing shown in FIG. 2 to meet the requirement that the interface conversion device 100 supports the normal plug orientation pin assignment E mode compliant with the USB specification.

Figure 9:
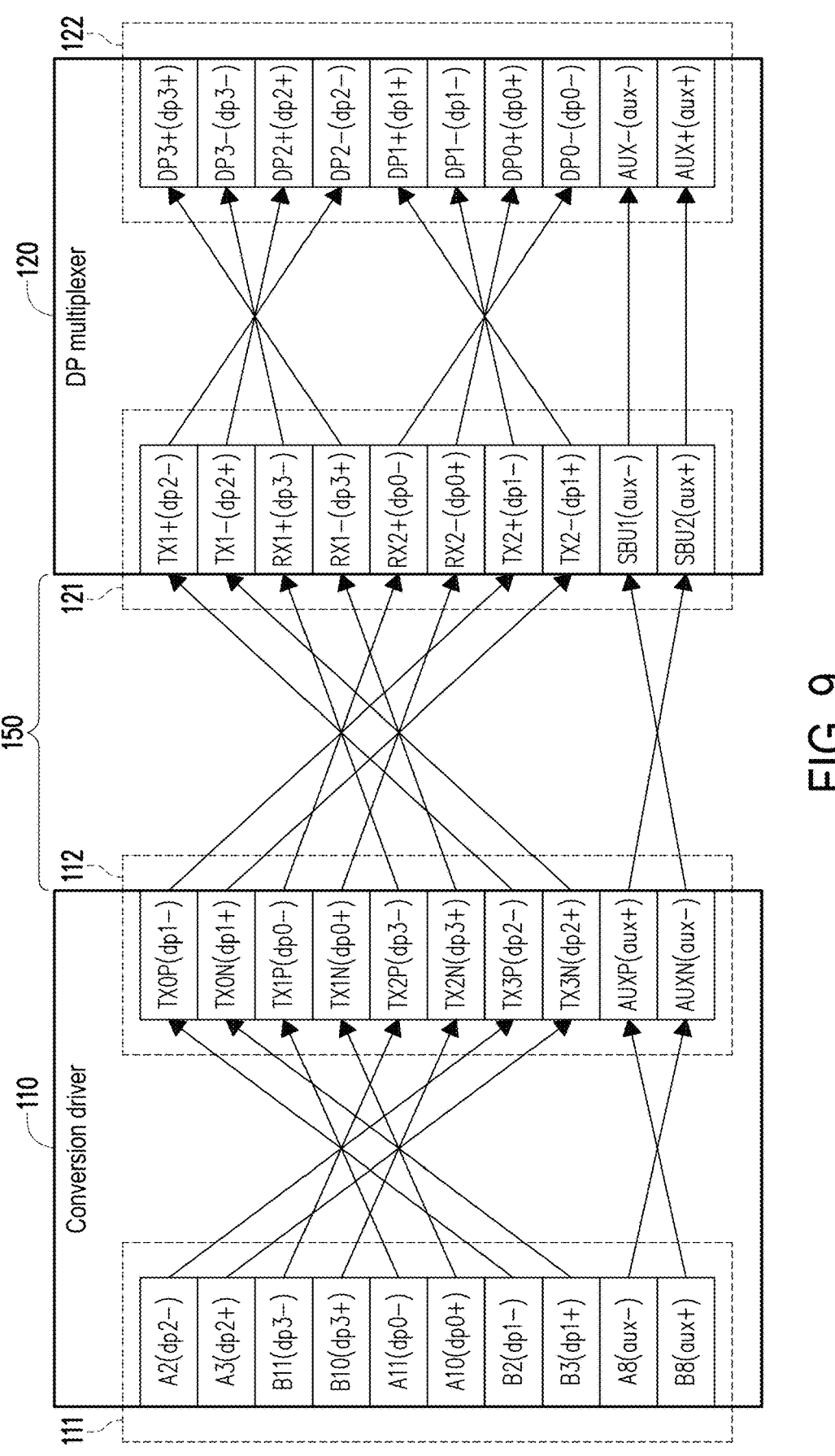
FIG. 9 is a schematic diagram of a signal route between a conversion driver and a DP multiplexer when an interface conversion device is in a flipped plug orientation pin assignment E mode shown according to an embodiment of the invention.

FIG. 9 is a schematic diagram of a signal route between the conversion driver 110 and the DP multiplexer 120 when the interface conversion device 100 is in a flipped plug orientation pin assignment E mode shown according to an embodiment of the invention. Please refer to FIG. 3 and FIG. 9. When the first pin assignment mode of the interface conversion device 100 is the flipped plug orientation pin assignment E mode compliant with the USB specification, the conversion driver 110 may set the second pin assignment mode to the normal plug orientation pin assignment C mode, and control the DP multiplexer 120 to set the third pin assignment mode to the flipped plug orientation pin assignment E mode. Regarding the details of the conversion driver 110 being the normal plug orientation pin assignment C mode, please refer to the embodiment shown in FIG. 4 for analogies, and the details are not repeated here. Regarding the details of the DP multiplexer 120 being the flipped plug orientation pin assignment E mode, please refer to the embodiment of FIG. 8 for analogies, and the details are not repeated here.

Accordingly, the interface conversion device 100 may support the flipped plug orientation pin assignment E mode compliant with the USB specification. The conversion driver 110, the route 150 (shown in FIG. 2), and the DP multiplexer 120 may complete correct data transmission. It is worth mentioning that in the embodiment of FIG. 9, the conversion driver 110 may adopt the normal plug orientation pin assignment C mode with the circuit board routing shown in FIG. 2 to meet the requirement that the interface conversion device 100 supports the flipped plug orientation pin assignment E mode compliant with the USB specification.

Based on the above, the interface conversion device of an embodiment of the invention may support a plurality of pin assignment modes compliant with the USB specification, and may be used with the circuit board routing shown in FIG. 2 to correctly complete data transmission between different transmission interfaces.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An interface conversion device, comprising:
 a USB connector;
 a DP connector;
 a conversion driver comprising an upstream-facing port and a DP output port, wherein the upstream-facing port of the conversion driver is coupled to the USB connector; and
 a DP multiplexer comprising a USB port and a DP port, wherein the USB port of the DP multiplexer is coupled to the DP output port of the conversion driver, the DP port of the DP multiplexer is coupled to the DP connector, wherein
 the conversion driver detects configuration information of a configuration channel pin of the USB connector,
 the conversion driver determines an operation mode and a first pin assignment mode of the interface conversion device according to the configuration information,
 when the operation mode is a DP ALT mode, the conversion driver sets a second pin assignment mode between the upstream-facing port and the DP output port based on the first pin assignment mode of the interface conversion device and controls the DP multiplexer based on the first pin assignment mode of the interface conversion device to set a third pin assignment mode between the USB port and the DP port.

2. The interface conversion device of claim 1, wherein, when the first pin assignment mode of the interface conversion device is a normal plug orientation pin assignment C mode compliant with a USB specification, the conversion driver sets the second pin assignment mode to the normal plug orientation pin assignment C mode, and the conversion driver controls the DP multiplexer to set the third pin assignment mode to the normal plug orientation pin assignment C mode.

3. The interface conversion device of claim 1, wherein, when the first pin assignment mode of the interface conversion device is a flipped plug orientation pin assignment C mode compliant with a USB specification, the conversion driver sets the second pin assignment mode to the flipped plug orientation pin assignment C mode, and the conversion driver controls the DP multiplexer to set the third pin assignment mode to a normal plug orientation pin assignment C mode compliant with the USB specification.

4. The interface conversion device of claim 1, wherein, when the first pin assignment mode of the interface conversion device is a normal plug orientation pin assignment D mode compliant with a USB specification, the conversion driver sets the second pin assignment mode to the normal plug orientation pin assignment D mode, and the conversion driver controls the DP multiplexer to set the third pin assignment mode to the normal plug orientation pin assignment D mode.

5. The interface conversion device of claim 1, wherein, when the first pin assignment mode of the interface conversion device is a flipped plug orientation pin assignment D mode compliant with a USB specification, the conversion driver sets the second pin assignment mode to the flipped plug orientation pin assignment D mode, and the conversion driver controls the DP multiplexer to set the third pin assignment mode to a normal plug orientation pin assignment D mode compliant with the USB specification.

6. The interface conversion device of claim 1, wherein, when the first pin assignment mode of the interface conversion device is a normal plug orientation pin assignment E mode compliant with a USB specification, the conversion driver sets the second pin assignment mode to a flipped plug orientation pin assignment C mode compliant with the USB specification, and the conversion driver controls the DP multiplexer to set the third pin assignment mode to a flipped plug orientation pin assignment E mode compliant with the USB specification.

7. The interface conversion device of claim 1, wherein, when the first pin assignment mode of the interface conversion device is a flipped plug orientation pin assignment E mode compliant with a USB specification, the conversion driver sets the second pin assignment mode to a normal plug orientation pin assignment C mode compliant with the USB specification, and the conversion driver controls the DP multiplexer to set the third pin assignment mode to the flipped plug orientation pin assignment E mode.

8. The interface conversion device of claim 1, wherein the USB port of the DP multiplexer is coupled to the DP output port of the conversion driver via a printed circuit board route.

9. The interface conversion device of claim 8, wherein,
 an ML_Lane_0 lane of the DP output port of the conversion driver is coupled to a TX2 high-speed lane of the USB port of the DP multiplexer via a first pair of wires of the printed circuit board route;
 an ML_Lane_1 lane of the DP output port of the conversion driver is coupled to an RX2 high-speed lane of the USB port of the DP multiplexer via a second pair of wires of the printed circuit board route;
 an ML_Lane_2 lane of the DP output port of the conversion driver is coupled to an RX1 high-speed lane of the USB port of the DP multiplexer via a third pair of wires of the printed circuit board route; and an ML_Lane_3 lane of the DP output port of the conversion driver is coupled to a TX1 high-speed lane of the USB port of the DP multiplexer via a fourth pair of wires of the printed circuit board route.

10. The interface conversion device of claim 8, wherein, a P auxiliary channel pin of the DP output port of the conversion driver is coupled to a first sideband use pin of the USB port of the DP multiplexer via a first wire of the printed circuit board route; and an N auxiliary channel pin of the DP output port of the conversion driver is coupled to a second sideband use pin of the USB port of the DP multiplexer via a second wire of the printed circuit board route.

\* \* \* \* \*